United States Patent [19]
Burns et al.

[11] Patent Number: 5,672,281
[45] Date of Patent: Sep. 30, 1997

[54] FLUID FILTERING APPARATUS AND METHOD

[75] Inventors: Ivey Lee Burns; William Glenn Ham, both of Orlando; Rory Dean Harvick, Clermont; Charles Leroy Holzman, Jr., Orlando, all of Fla.

[73] Assignee: Walt Disney World Co., Lake Buena Vista, Fla.

[21] Appl. No.: 560,477

[22] Filed: Nov. 17, 1995

[51] Int. Cl.⁶ .................... C02F 1/00; B01D 21/24
[52] U.S. Cl. .................. 210/744; 210/102; 210/106; 210/108; 210/111; 210/104; 210/413; 210/791; 210/159
[58] Field of Search ................... 210/106, 107, 210/108, 110, 111, 413, 99, 744, 791, 433.1, 353, 407, 159, 102, 104

[56] References Cited

U.S. PATENT DOCUMENTS

| | | |
|---|---|---|
| 2,293,120 | 8/1942 | Delisle ................... 210/791 |
| 2,603,354 | 7/1952 | Way et al. ............... 210/413 |
| 2,716,489 | 8/1955 | Way ....................... 210/413 |
| 4,217,116 | 8/1980 | Seever .................... 210/106 |
| 4,279,760 | 7/1981 | Yamamoto ............... 210/791 |
| 4,482,461 | 11/1984 | Hindman et al. ........ 210/791 |
| 4,904,397 | 2/1990 | Elmer et al. ............. 210/791 |
| 5,076,941 | 12/1991 | Goodman et al. ....... 210/791 |
| 5,213,696 | 5/1993 | Patrone et al. .......... 210/791 |
| 5,250,198 | 10/1993 | Stedfeldt ................. 210/791 |
| 5,259,955 | 11/1993 | Bolton .................... 210/413 |
| 5,356,532 | 10/1994 | Wilkins et al. .......... 210/107 |
| 5,356,541 | 10/1994 | Wickzell ................. 210/413 |

*Primary Examiner*—Ana Fortuna
*Attorney, Agent, or Firm*—Allen, Dyer, Doppelt, Milbrath & Gilchrist, P.A.

[57] ABSTRACT

An apparatus and method for separating an effluent into a filtered liquid component and a concentrated sludge component are described. A screen for filtering the effluent is positioned to divide a chamber into two compartments, one for concentrating sludge and one for receiving filtered liquid. The screen is curved in an arc that extends away from the liquid outlet, and a spray arm is mounted for arcuate motion to conform to the curvature of the screen to dispense a fluid against the screen to dislodge attached sludge, to unclog the screen apertures.

20 Claims, 3 Drawing Sheets

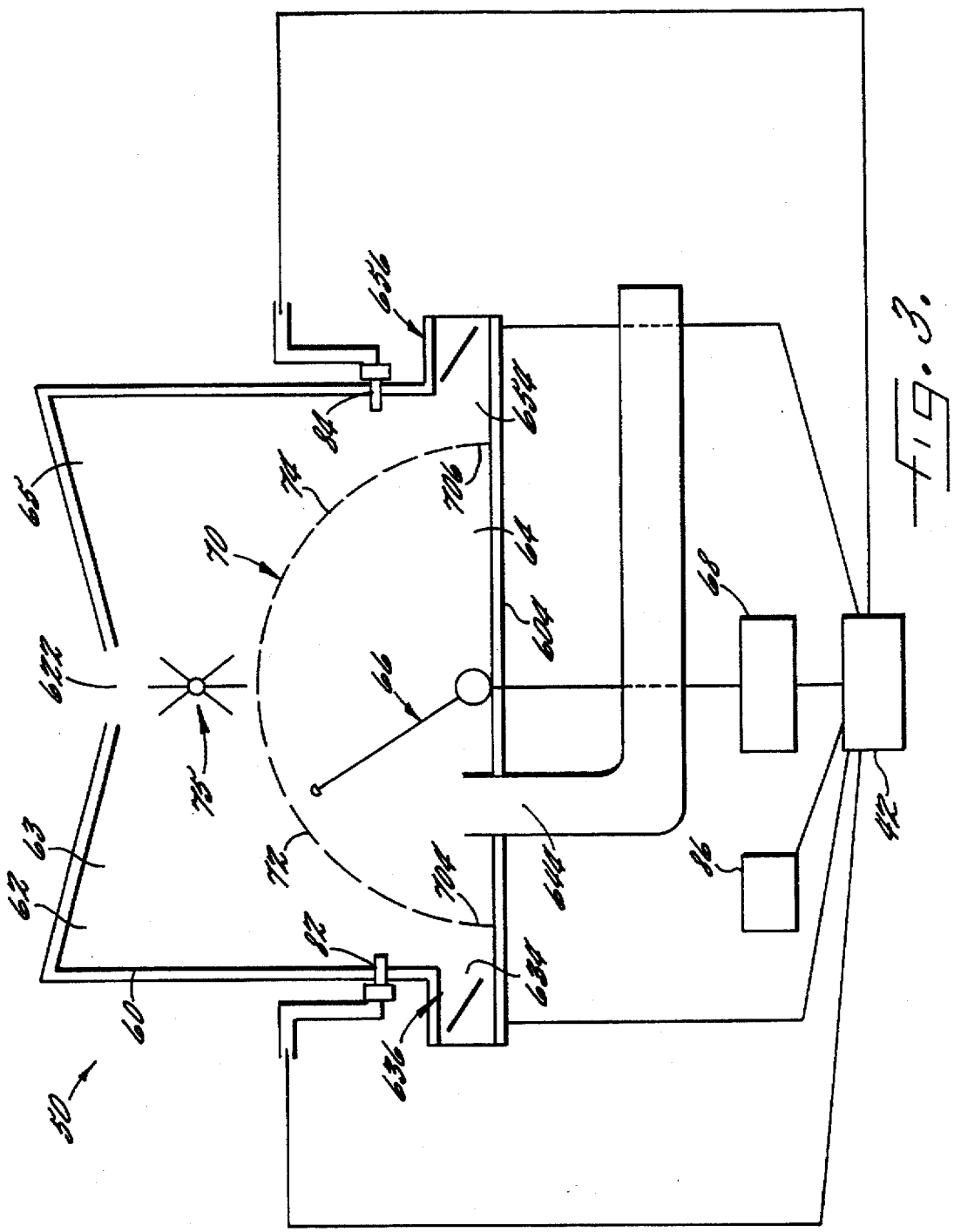

FLUID FILTERING APPARATUS AND METHOD

BACKGROUND OF THE INVENTION

1. Field of the Invention

The present invention relates to devices for filtering fluids having solids therein and, more particularly, to devices for filtering effluent to obtain a filtered water component and a sludge component.

2. Description of Related Art

In many disciplines a need has arisen to separate liquids from solids. This problem, which occurs in water purification, among other areas, has been addressed in part by filtering solids from a stream of effluent with the use of a filtering medium to trap solids and permit the water to flow through. A particular type of filter to be addressed herein is for use in conjunction with aquatic tanks, although this intended use is not meant to be limiting.

Previously work has discussed an apparatus for separating a liquid from a solid component: Way et al. (U.S. Pat. No. 2,603,354) teaches a device including a chamber having an inlet and two outlets, across one of which is positioned a planar screen that separates a concentrate compartment from a filtered liquid compartment. A spray arm is mounted for reciprocal movement along the screen that sprays water against the screen to dislodge attached solid matter and prevent clogging.

In related work, Way (U.S. Pat. No. 2,716,489) discloses a timing system for operating a valve for the above concentrate-producing system. The valve is opened to release accumulated concentrate after a fixed period of time.

SUMMARY OF THE INVENTION

It is an object of the present invention to provide an apparatus and method for filtering a fluid stream into a fluid and a concentrated solids component.

It is another object to provide such an apparatus and method having means for unclogging the filtering system.

It is a further object to provide such an apparatus and method having means for sensing when the filtering system requires unclogging.

It is an additional object to provide such an apparatus and method having means for sensing when the concentrated solids component should be removed.

It is yet another object to provide such an apparatus and method that permits efficient use and reclamation of water.

It is yet a further object to provide such an apparatus and method for use in a fish tank that requires less energy input to heat tank water.

A first embodiment of the present invention is an apparatus for separating an effluent into a filtered liquid component and a concentrated sludge component. The apparatus comprises a chamber and a screen for filtering the effluent. The screen is positioned to divide the chamber into two compartments. The first compartment, wherein sludge is concentrated, has an inlet for incoming effluent and a sludge outlet. The second compartment, which is for receiving filtered liquid, has a liquid outlet. The screen is curved in an arc that extends away from the liquid outlet.

The separating apparatus also comprises a spray arm, which is mounted in the second compartment for arcuate motion designed to conform to the curvature of the screen. The spray arm is adapted for dispensing a fluid against the screen to dislodge attached sludge, which is then forced by the pressure of the fluid back into the first compartment, freeing the screen holes to permit continued filtering. The spray arm has a distal dispensing end that is dimensioned to maintain a spaced relation to the screen throughout the arcuate motion. The spacing is preferably fairly close in order to maximize the efficiency of the unclogging operation.

In a second embodiment of the present invention, the separating apparatus comprises a chamber and a screen for filtering the effluent, which are positioned to divide the chamber into two compartments as previously. The first compartment, which is for concentrating sludge, has an inlet for incoming effluent, a first sector having a first sludge outlet, and a second sector having a second sludge outlet. The first and the second sectors are adjacent, respectively, a first and a second portion of the screen. The second compartment, which is for receiving filtered liquid from the first and the second sectors, has a liquid outlet, and the screen is again curved in an arc extending away from the liquid outlet.

The second embodiment of the apparatus further comprises means for apportioning incoming effluent from the inlet between the first compartment sectors. In a preferred embodiment, this apportioning means is responsive to the sensed effluent levels in the two sectors, and can serve to prevent overflow in one sector if its corresponding screen portion becomes clogged.

The spray arm, as in the first embodiment, is mounted in the second compartment for describing an arcuate motion that conforms to the curvature of the screen.

The present invention further comprises methods of separating an effluent into a filtered liquid component and a concentrated sludge component, utilizing the embodiments described above.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 3 is a schematic illustration of the second embodiment of the screen filter.

DETAILED DESCRIPTION OF THE PREFERRED EMBODIMENTS

Figure 1:
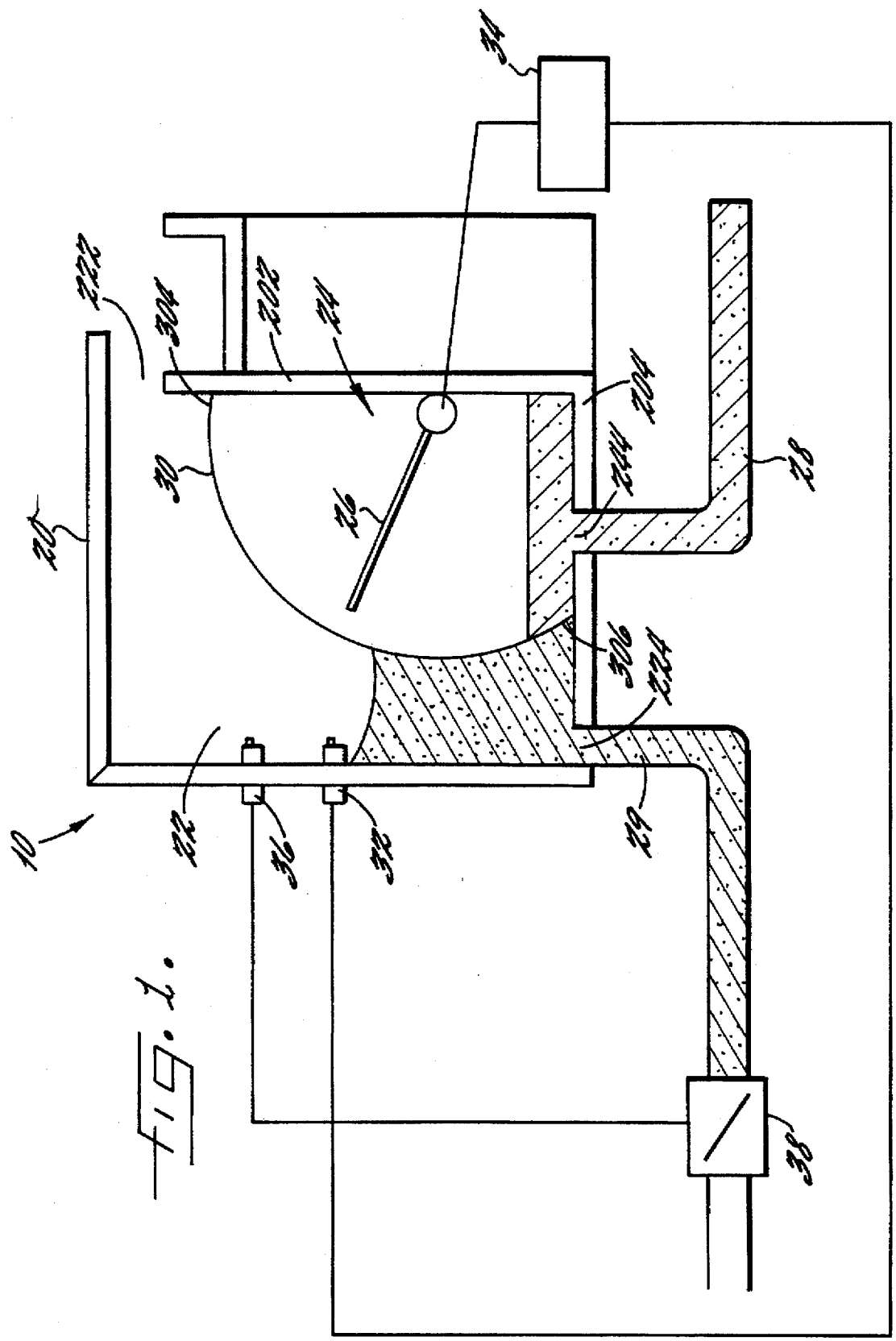
FIG. 1 is a schematic illustration of the first embodiment of the screen filter.
Figure 2:
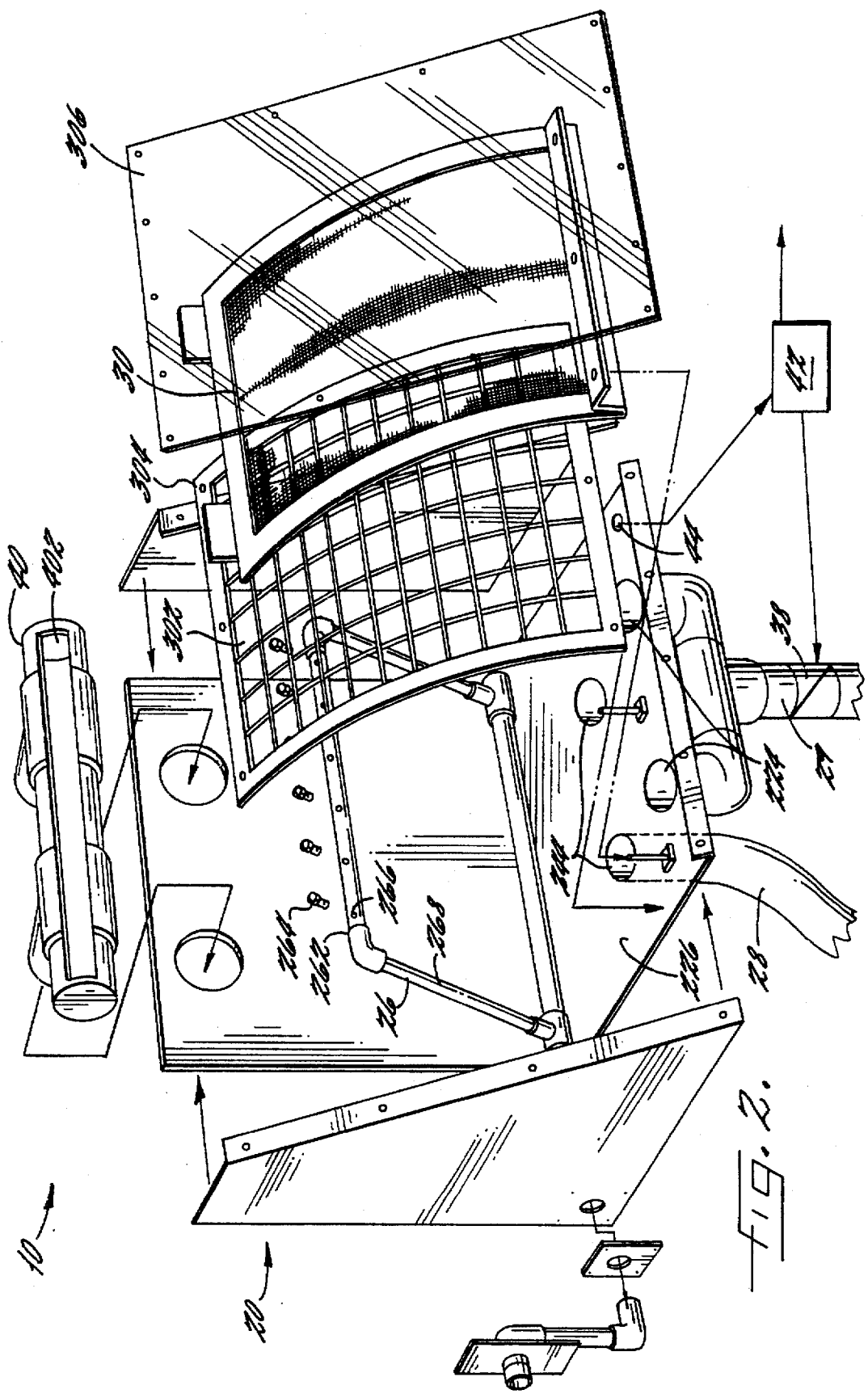
FIG. 2 is an exploded view of the first screen filter embodiment.

A description of the preferred embodiments of the present invention will now be presented with reference to FIGS. 1–3.

The screen filter of the present invention comprises an apparatus for separating an effluent into a filtered liquid component and a concentrated sludge component. A first embodiment 10 of the apparatus, as shown schematically in FIG. 1 and in an exploded view in FIG. 2, comprises a chamber 20 that is divided into two compartments by a curved screen 30. The screen 30, which is supported by curved support grate 304, is used to filter incoming effluent that is directed first into an upper tube 40, from which the effluent spills out of tube aperture 402 into the inlet 222 of the first compartment 22. First compartment 22 is bounded on the outside by plate 306. Sludge is concentrated, as will be discussed in the following, in the first compartment 22 and exits from the sludge outlet 224.

The second compartment 24 of the chamber 20 receives liquid that has been filtered by the screen 30, and the liquid leaves the second compartment 24 via the liquid outlet 244. The screen 30 is curved in an arc that extends away from the liquid outlet 244. The arc in this embodiment is shown to subtend an angle in the range of approximately 90 degrees, since the screen 30 is affixed along a top edge 304 to a side wall 202 of the chamber 20 and along a bottom edge 306 along a bottom 204 of the chamber 20. This geometry creates a second compartment 24 having the general shape of a quarter-cylinder, with a quarter-circular cross-sectional shape, although this shape is not meant to be limiting.

An additional element of the screen filter is a spray arm 26 mounted in the second compartment 24. The spray arm 26 is movable in an arcuate path that conforms to the curvature of the screen 30. The spray arm 26, which is shown in FIG. 2 as a rectangularly formed pipe 268, is utilized to dispense a fluid against the screen to dislodge attached sludge that clogs the screen apertures 302. This matching of the screen curvature and spray arm motion permits the spray arm 26 to remain as close to the screen 30 as possible, so that the spray arm's distal dispensing end, which in this embodiment comprises a plurality of nozzles 264 inserted into holes 266 in the pipe's distal section 262, can maintain a generally fixed spaced relation to the screen 30 throughout the arcuate motion.

The filtered liquid is transported from the liquid outlet 244 to a second filtering system such as a biofilter via another piping system 28. The concentrated sludge proceeds from sludge outlet 224 to a drain system 29.

Screen filter 10 additionally comprises a control system to permit automatic functioning, which is shown schematically in FIG. 1. A first sensor 32 is positioned in the first compartment 22 at a height between the inlet 222 and the sludge outlet 244. The first sensor 32 senses when the effluent level reaches this height and turns on a spray arm switch 34 that controls the spray arm 26. Typically effluent will only reach the height of the first sensor 32 when the screen 30 has become clogged with solids; so the spray arm 26 is triggered at an appropriate time to alleviate this clogging and permit the screen 30 to continue performing its filtering function.

Another component of the control system includes a second sensor 36 that is positioned in the first compartment 22 at a height between the inlet 222 and the first sensor 32 that also senses effluent level. The second sensor 36 is in communication with a valve 38, which is in fluid communication with the sludge outlet 224. Valve 38 is movable between an open position for permitting sludge to drain from the first compartment 22 and a closed position for retaining sludge in the first compartment 22. Thus when the effluent level reaches the height of the second sensor 36, the valve 38 is opened in order to prevent the effluent from reaching the inlet and backing up.

In another embodiment the control system, shown schematically in FIG. 2, is under microcomputer 42 control. Instead of the two sensors, a pressure transducer 44, in communication with the microcomputer 42, is affixed to the bottom 226 of the first compartment 22 for measuring the time rate of change of fluid height in the first compartment 22. This is not meant to be limiting, however, as other level sensing means are usable as well, such as laser or ultrasonic level sensors.

With this control system, the spray arm 26 is directed by the microcomputer 42 to begin spraying when the screen 30 is calculated to be clogged. Additionally, the microcomputer 42 directs the valve 38 to open when the pressure transducer 44 indicates that the amount of effluent in the first compartment 22 has risen to adjacent the inlet 222. This valve opening prevents the apparatus 10 from backing up.

A second embodiment 50 of the separation apparatus, shown schematically in FIG. 3, also comprises a chamber 60, a screen 70, and a spray arm 66.

In this embodiment, screen 70 is also positioned to divide the chamber 60 into a first compartment 62 for receiving incoming effluent through inlet 622 and for concentrating sludge and a second compartment 64 for receiving filtered liquid. However, in this case the first compartment 62 is further separated into a first sector 63 having a first sludge outlet 634 and a second sector 65 having a second sludge outlet 654. The first 63 and the second 65 sectors are adjacent, respectively, a first 72 and a second 74 portion of the screen. As previously, the second compartment 64 has a liquid outlet 644.

In association with the first 63 and the second 65 sectors are a first 636 and a second 656 valve, which are in fluid communication with the first 634 and the second 654 sludge outlets, respectively. Each of these valves 636,656 is movable between an open and a closed position, the open position for permitting sludge to drain from the first compartment 62 and the closed position for retaining sludge in the first compartment 62.

The chamber 60 is generally rectangular in cross section, and the screen 70 is curved in an arc extending away from the liquid outlet 644 that in a preferred embodiment describes a half-cylinder, with opposed edges 704,706 both attached to the chamber bottom 604, so that screen 70 generally describes a half-circle in cross section.

Between the inlet 622 and the screen 70 is positioned means for apportioning incoming effluent between the first compartment sectors 63,65. In a particular embodiment, this element takes the form of a rotating deflector plate 75, which under conditions of equilibrium directs generally equal amounts of incoming effluent to the first 63 and second 65 sectors.

The spray arm 66 is again mounted in the second compartment 64 for arcuate motion that conforms to the curvature of the screen 70. In this case, in order to dispense fluid to the entire screen 70, the spray arm 66 is movable through an arc of generally 180 degrees. Additionally, the spray arm 66 is adapted to be differentially movable along the first 72 and the second 74 screen portions, which permits the fluid to be dispensed differentially thereagainst for dislodging attached sludge thereto differentially.

The control system for this embodiment comprises a microcomputer 42 in communication with a first sector sensor 82 that is positioned in the first sector 66 at a height between the inlet 622 and the first sludge outlet 634. This sensor 82 senses an effluent level and, through the microcomputer 42, is in communication with a spray arm controller 68 to activate the spray arm 66 to dispense fluid along the screen first portion 72 when the effluent in the first sector 63 reaches the height of the first sector sensor 82.

Similarly, a second sector sensor 84, also in communication with the microcomputer 42, is positioned in the second sector 65 at a height between the inlet 622 and the second sludge outlet 654. This sensor 84 senses an effluent level and is in communication with the spray arm controller 68 via the microcomputer 42 to activate the spray arm 66 to dispense fluid along the screen second portion 74 when the effluent in the second sector 65 reaches the height of the second sector sensor 84.

The control system further comprises a timer 86 for limiting the activation of the spray arm 66 to a predetermined spraying time, this time determined on the basis of individual site requirements. The timer 86 is in communication, through the microcomputer 42, with the first 636 and the second 656 valve for opening the appropriate valve 636 or 656 when the spray arm 66 has completed a spraying of the associated screen portion 72 or 74.

In addition, input from the first 82 and second 84 sector sensors is used to direct the reflecting plate 75 to apportion a greater amount of incoming effluent to the first 63 or the second 65 sector based upon their relative effluent levels, so that the sector experiencing the greater effluent level receives a lesser amount of incoming effluent. In the case wherein the sensors 82,84 both sense the presence of no effluent, the reflecting plate 75 directs generally equal amounts of incoming effluent to the sectors 63,65.

This embodiment of the separation apparatus 50 has been found to be highly water efficient. In the application for which this screen filter is used, effluent from tanks housing high densities of fish is being cleansed, which in previously disclosed systems is highly water intensive. The combination of sensors, deflector, and using the spray arm to unclog the screen has resulted in far less water exiting via the drains and instead being recycled into the tanks. In a particular application, it has been estimated that 10–20 million gallons of water will be saved per year per 6000 gallon tank. The higher density of sludge produced by this apparatus is also more convenient and efficient to recycle for use in composting, for instance, since less water has to be removed.

In addition, since fish tank water must often be heated prior to introduction into the tank, typically in the range of 5 degrees F. in a particular application, the apparatus and method also save energy by requiring less water to be heated.

The separation method utilizing the first embodiment of the screen filter 10 (FIGS. 1 and 2) comprises the steps of directing effluent into the first compartment inlet 222 and permitting a liquid component of the effluent to filter through the screen 30 into the second compartment 24 and out through the liquid outlet 244. The effluent level in the first compartment 22 is sensed at a first height 322 between the inlet 222 and the sludge outlet 224. When the sensed effluent level is reaches the first height, the spray arm 26 is directed to dispense a fluid against the screen 30 to dislodge attached sludge using the spray arm 26.

During operation, the effluent level is also sensed in the first compartment 22 at a second height 362 between the inlet 222 and the first height 322. When the sensed effluent level reaches the second height 362, sludge is drained from the first compartment 22, preventing the effluent level from reaching a height of the inlet and backing up.

The separation method utilizing the second embodiment of the screen filter 50 (FIG. 3) comprises the steps of apportioning incoming effluent from the inlet 622 between the first compartment sectors 63,65 and permitting a liquid component of the effluent to filter through the screen 70 into the second compartment 64 and out through the liquid outlet 644. A greater amount of incoming effluent is apportioned to the first 63 or the second 65 sector based upon their relative effluent levels, the sector having a greater effluent level receiving a lesser amount of incoming effluent. The effluent level in the first sector 63 is sensed at a first sector height 632 between the inlet 622 and the first sludge outlet 634. When the effluent in the first sector 63 is sensed to have reached the first sector height 632, the spray arm 66 is activated to dispense fluid differentially along the screen first portion 72.

Likewise, the effluent level in the second sector 65 is sensed at a second sector 652 height between the inlet 622 and the second sludge outlet 654, and, when the effluent in the second sector 65 is sensed to have reached the second sector height 652, the spray arm 66 is activated to dispense fluid differentially along the screen second portion 74.

In similar fashion to the first embodiment, the spray arm 66 is limited to a predetermined spraying time, and sludge is permitted to drain from the first compartment 62 following the predetermined spraying time. Then the sludge outlets 634,654 are closed via valves 636,656, respectively.

It may be appreciated by one skilled in the art that additional embodiments may be contemplated, including a system for filtering other fluids containing a solids component.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. An apparatus for separating an effluent into a filtered liquid component and a concentrated sludge component, the apparatus comprising:

a chamber;

a screen for filtering the effluent positioned to divide the chamber into a first compartment for concentrating sludge, the first compartment having an inlet for incoming effluent and a sludge outlet, and a second compartment for receiving filtered liquid, the second compartment having a liquid outlet, the screen curved in an arc extending away from the liquid outlet; and a spray arm pivotable mounted in the second compartment for arcuate motion conforming to the curvature of the screen for dispensing a fluid against the screen to dislodge sludge attached thereto, the spray arm having a distal dispensing end maintaining a spaced relation to the screen throughout the arcuate motion.

2. The separating apparatus recited in claim 1, further comprising:

a spray arm switch for controlling the spray arm; and a first sensor means positioned in the first compartment at a height between the inlet and the sludge outlet for sensing an effluent level, the first sensor means in communication with the spray arm switch for turning on the spray arm switch when the effluent in the first compartment reaches the first sensor means height.

3. The separating apparatus recited in claim 2, further comprising:
- a valve in fluid communication with the sludge outlet movable between an open and a closed position, the open position for permitting sludge to drain from the first compartment and the closed position for retaining sludge in the first compartment; and
- a second sensor means positioned in the first compartment at a height between the inlet and the first sensor means for sensing an effluent level, the second sensor means in communication with the valve for opening the valve when the effluent level reaches the second sensor means height for preventing the effluent level from reaching a height of the inlet and thereby backing up.

4. The separating apparatus recited in claim 1, further comprising:
- a valve in fluid communication with the sludge outlet movable between an open and a closed position, the open position for permitting sludge to drain from the first compartment and the closed position for retaining sludge in the first compartment;
- a processor in controlling communication with the spray arm and with the valve;
- a level sensing means for measuring an amount of effluent present in the first compartment, the level sensing means in communication with the processor;
- means resident in the processor for activating the spray arm when the amount of effluent in the first compartment measured by the level sensing means indicates that the screen is clogged; and
- means resident in the processor for opening the valve when the level sensing means indicates that the amount of effluent in the first compartment has risen to adjacent the inlet, thereby preventing the apparatus from backing up.

5. The apparatus recited in claim 4, wherein the level sensing means comprises a pressure transducer positioned generally at a bottom of the first compartment.

6. An apparatus for separating an effluent into a filtered liquid component and a concentrated sludge component, the apparatus comprising:
- a chamber;
- a screen for filtering the effluent positioned to divide the chamber into a first compartment for concentrating sludge, the first compartment having an inlet for incoming effluent, a first sector having a first sludge outlet, and a second sector having a second sludge outlet, the first and the second sectors adjacent, respectively, a first and a second portion of the screen, and a second compartment for receiving filtered liquid from the first and the second sectors, the second compartment having a liquid outlet, the screen curved in an arc extending away from the liquid outlet;
- means for apportioning incoming effluent from the inlet between the first compartment sectors; and
- a spray arm mounted in the second compartment for arcuate motion conforming to the curvature of the screen for dispensing a fluid against the screen to dislodge sludge attached thereto, the spray arm having a distal dispensing end maintaining a spaced relation to the screen throughout the arcuate motion.

7. The separating apparatus recited in claim 6, wherein the spray arm is differentially movable along the first and the second screen portions, for dispensing a fluid differentially against the first and the second screen portions and dislodging sludge attached thereto.

8. The separating apparatus recited in claim 7, further comprising:
- means for controlling the spray arm differential movement;
- a first sector sensing means positioned in the first sector at a height between the inlet and the first sludge outlet for sensing an effluent level, the first sector sensing means in communication with the spray arm control means for activating the spray arm to dispense fluid along the screen first portion when the effluent in the first sector reaches the first sector sensing means height; and
- a second sector sensing means positioned in the second sector at a height between the inlet and the second sludge outlet for sensing an effluent level, the second sector sensing means in communication with the spray arm control means for activating the spray arm to dispense fluid along the screen second portion when the effluent in the second sector reaches the second sector sensing means height.

9. The separating apparatus recited in claim 8, further comprising:
- means in communication with the spray arm control means for limiting the activation of the spray arm to a predetermined spraying time;
- a first and a second valve in fluid communication with the first and the second sludge outlets, respectively, each valve movable between an open and a closed position, the open position for permitting sludge to drain from the first compartment and the closed position for retaining sludge in the first compartment; and
- wherein the first and the second valve are in communication with the limiting means for opening the first and the second valve when the spray arm has completed a spraying of the first and the second screen portion, respectively.

10. The separating apparatus recited in claim 9, wherein the apportioning means is in communication with the first and the second sector sensing means for apportioning a greater amount of incoming effluent to the first or the second sector based upon relative effluent level in the first and the second sectors, the sector having a greater effluent level receiving a lesser amount of incoming effluent.

11. The separating apparatus recited in claim 10, wherein, when the first and the second sector sensing means both sense the presence of no effluent, the apportioning means directs generally equal amounts of incoming effluent to the first and the second sectors.

12. A method for separating an effluent into a filtered liquid component and a concentrated sludge component, the method comprising the steps of:
- providing a chamber;
- dividing the chamber into a first compartment having an inlet for incoming effluent and a sludge outlet and a second compartment having a liquid outlet, the chamber divided with a screen for filtering the effluent and for concentrating sludge, the screen curved in an arc extending away from the liquid outlet;
- directing effluent into the first compartment inlet;
- permitting a liquid component of the effluent to filter through the screen into the second compartment and out through the liquid outlet; and
- dispensing a fluid against the screen to dislodge sludge attached thereto using a spray arm pivotable mounted in the second compartment for arcuate motion conforming to the curvature of the screen, the spray arm having a distal dispensing end maintaining a spaced relation to the screen throughout the arcuate motion.

13. The effluent separating method recited in claim 12, further comprising the steps of:

sensing an effluent level in the first compartment at a first height between the inlet and the sludge outlet; and activating the spray arm when the sensed effluent level is sensed to reach the first height.

14. The effluent separating method recited in claim 13, further comprising the steps of:

sensing an effluent level in the first compartment at a second height between the inlet and the first height; and draining sludge from the first compartment when the sensed effluent level reaches the second height, to prevent the effluent level from reaching a height of the inlet and thereby backing up.

15. A method for separating an effluent into a filtered liquid component and a concentrated sludge component, the method comprising the steps of:

providing a chamber;

dividing the chamber into a first compartment and a second compartment, the first compartment having an inlet for incoming effluent, a first sector having a first sludge outlet, and a second sector having a second sludge outlet, the second compartment having a liquid outlet, the chamber divided with a screen for filtering the effluent and for concentrating sludge, the screen curved in an arc extending away from the liquid outlet, the first and the second sectors adjacent, respectively, a first and a second portion of the screen;

apportioning incoming effluent from the inlet between the first compartment sectors;

permitting a liquid component of the effluent to filter through the screen into the second compartment and out through the liquid outlet; and dispensing a fluid against the screen to dislodge sludge attached thereto using a spray arm mounted in the second compartment for arcuate motion conforming to the curvature of the screen, the spray arm having a distal dispensing end maintaining a spaced relation to the screen throughout the arcuate motion.

16. The separating method recited in claim 15, wherein the dispensing step comprises moving the spray arm differentially along the first and the second screen portions, for dispensing a fluid differentially against the first and the second screen portions and dislodging sludge attached thereto.

17. The separating method recited in claim 16, further comprising the step of:

sensing an effluent level in the first sector at a first sector height between the inlet and the first sludge outlet;

activating the spray arm to dispense fluid along the screen first portion when the effluent in the first sector is sensed to have reached the first sector height;

sensing an effluent level in the second sector at a second sector height between the inlet and the second sludge outlet; and activating the spray arm to dispense fluid along the screen second portion when the effluent in the second sector is sensed to have reached the second sector height.

18. The separating method recited in claim 17, further comprising the steps of:

limiting the activation of the spray arm to a predetermined spraying time;

permitting sludge to drain from the first compartment following the predetermined spraying time.

19. The separating method recited in claim 18, further comprising the step, following the permitting step, of closing the first and the second sludge outlet.

20. The separating method recited in claim 18, wherein the apportioning step comprises apportioning a greater amount of incoming effluent to the first or the second sector based upon relative effluent level in the first and the second sectors, the sector having a greater effluent level receiving a lesser amount of incoming effluent.

* * * * *